INVENTOR
LEONARD PETER MORGAN
BY [signature]
AGENT

July 4, 1961 L. P. MORGAN 2,991,373

DEVICE COMPRISING AN ASYMMETRICAL TRANSISTOR TRIGGER CIRCUIT AND TWO INPUT NETWORKS

Filed Jan. 31, 1956 2 Sheets-Sheet 2

INVENTOR
LEONARD PETER MORGAN
BY [signature]
AGENT

United States Patent Office 2,991,373
Patented July 4, 1961

2,991,373

DEVICE COMPRISING AN ASYMMETRICAL TRANSISTOR TRIGGER CIRCUIT AND TWO INPUT NETWORKS

Leonard Peter Morgan, Purley, England, assignor, by mesne assignments, to North American Philips Company, Inc., New York, N.Y., a corporation of Delaware Filed Jan. 31, 1956, Ser. No. 562,529
Claims priority, application Great Britain Feb. 1, 1955
17 Claims. (Cl. 307—88.5)

The invention relates to a device comprising an asymmetrical trigger circuit having two transistors conductively coupled with one another via their emitter circuits, the feed-back loop being completed by a conductive connection between the base of the second transistor and the collector of the first transistor, the device further comprising two input networks.

According to the invention, each of the input networks comprises, as series-elements, at least one rectifier diode and at least one separation capacitor connected in series with the diode, and as shunt elements, at least two resistors connected one on each side of the diode and where by a first electrode of each diode receives a reference potential and the second electrode receives a control-potential varying with the state of the ring trigger circuit, in such a manner that the trigger circuit can be switched-over from a first state into a second state and vice-versa by means of a single source of pulses of the same polarity or by means of pulses of opposite polarities applied to a single input terminal and originating from two different pulse sources.

The invention will be described more fully with reference to the accompanying drawing, in which FIG. 1 shows a first embodiment of a device according to the invention.

In the figures corresponding elements are designated by the same reference numerals.

Figure 1:
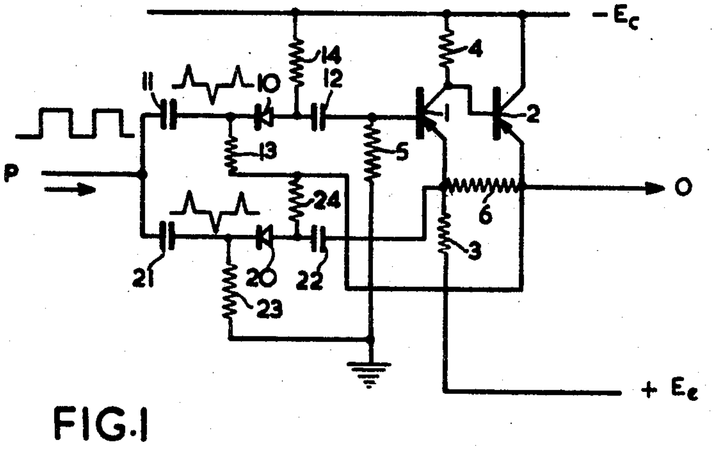

The embodiment shown in FIG. 1 comprises a bistable trigger circuit having a first junction transistor 1 of the pnp-type, the emitter and collector of which are respectively connected via resistor 3 respectively 4 to the terminals +E*e* and —E*c* of a voltage source. A second junction transistor 2, also of the pnp-type, is fed from the same source. A feed-back loop consists of a first direct connection by which the base of the second transistor is exclusively connected to the collector of the first transistor, and of a second conductive connection, by which the emitter of the second transistor is coupled with that of the first transistor through a resistor 6 of for example 1K ohm. The collector of the transistor 2 is directly connected to the terminal —E*c*; the terminals +E*e* and —E*c* are at potentials of for example +3 and —9 v. relative to earth and the resistors 3 and 4 may have values of for example 1 and 4K ohm respectively.

Consequently, the transistor 1 operates as an amplifier in grounded base connection and the transistor 2 operates in grounded collector connection. The current amplification of the transistor 1 is the ratio between its collector current variations and its emitter courrent variations and is designated by $\alpha$. Junction transistors have an amplification factor $\alpha$ of slightly less than 1 and in grounded base connection they exhibit a low input impedance and a high output impedance. The current amplification of the transistor 2 is the ratio between its collector current variations and its base current variations and is designated by $\alpha'$. Junction transistors have a value of $\alpha'$, which materially exceeds $\alpha$ (for example of the order of 50), and in grounded collector connection they exhibit a correspondingly higher input impedance and a lower output impedance.

Since voltage variations at the input of each transistor produce voltage variations of the same polarity in the corresponding output circuit, the loop formed from the collector of the first transistor to the base of the second transistor, passing across the base-emitter path of the latter to the emitter of the first transistor and through the emitter-collector path of the latter back to its collector will operate as a feed-back loop and provide a positive feed-back.

It is first assumed that the transistor 1 is conductive, its collector- and emitter currents being thus mainly determined by the value of the resistor 3 and by the positive voltage +E*e*. The value of the resistor 4 is so high that the collector potential of the transistor 1 is in this state almost equal to its emitter potential. The emitter current of the second transistor is determined by this small potential difference divided by the sum of the resistance of the resistor 6 and of the base-emitter-input resistance of the transistor 2. This input resistance is comparatively high, so that the current passing through the base-emitter circuit of the second transistor is kept at such a value that this transistor remains conductive only to a small extent and the trigger circuit is stable in this state.

If it is assumed that the second transistor 2 is conductive, its emitter current is mainly determined by the values of the resistors 3 and 6 and by the potential at its base, which is equal to the collector potential of the transistor 1. Since the collector circuit of this transistor comprises a comparatively high resistance and the collector of the transistor 2 is, on the contrary, directly connected to the terminal —E*c*, the current passing through the transistor 2 exceeds the emitter current drained by the transistor 1 in the state first described. Owing to this current difference, the emitter of the transistor 1 is then negative relative to its base, so that this transistor is cut off. The trigger circuit can also take these two alternative stable states, if a load resistor is included in the collector circuit of the transistor 2, provided that this resistor is smaller than the resistor 4 or that it is connected to a collector voltage source of a higher absolute value, the difference between the two alternative collector currents being such that the emitter of the transistor 1 becomes positive with respect to its base in a first state and negative in a second state.

If the transistor 1 is conductive, the trigger circuit can be switched over into its other state by a negative pulse applied to any point of the feed-back loop or by a positive pulse applied to the base of the transistor 1. If the trigger circuit is controlled on the base of the transistor 1, the latter is connected to earth via a resistor 5 of for example 1K ohm.

If the transistor 1 is cut off, the trigger circuit can be switched over by a positive pulse applied to a point of the feed-back loop or by a negative pulse applied to the base of the transistor 1.

The device shown in FIG. 1 comprises a gate circuit, consisting of two input networks. These input networks are connected between an input terminal P of the arrangement and two input points of the trigger circuit, in such a manner that, if the transistor 1 is saturated, a pulse from a source of pulses connected to point P is fed to its emitter and, if the same transistor is not conductive, such a pulse is applied to its base. The device thus operates as a binary counter, in which each pulse switches over the state of the bistable trigger circuit.

The first of the said input networks comprises, as series elements, a rectifier diode 10 and two separation capacitors 11 and 12 connected in series with the diode, so that the potential of the output electrode of the diode 10 is independent from the potential at the base of the transistor 1, to which the capacitor 12 is connected and which constitutes the first input point of the trigger circuit. The said input network comprises furthermore, as shunt-elements, two resistors 13 and 14, connected each on one side of the diode 10. Via the resistor 14 the potential at the terminal —E*c*, serving as a reference potential, is supplied to the output electrode or anode of the diode 10, whilst the input electrode or cathode of this diode receives, via the resistor 13, a control-potential which varies with the state of the trigger circuit and which is obtained from the emitter of the second transistor 2. The second input network comprises a diode 20, connected in series between two series connected capacitors 21 and 22, and two shunt-resistors 23 and 24. Via the resistor 24, the output electrode or anode of the diode 20 receives the same control-potential as the cathode or input electrode of the diode 10. Via the resistor 23, the cathode or input electrode of the diode 20 receives earth potential, i.e. a fixed potential which is also applied to the base of the first transistor.

The device described here above is controlled by means of negative pulses. For example, square-wave pulses are differentiated by the capacitors 11 and 21 and the resistors 13 and 23 respectively, so that for each square-wave pulse applied to point P a positive and a negative peak occur at the diodes 10 and 20. In accordance with the control- and reference potentials at the electrodes of each of these diodes, a negative peak reaches only one or the other input point of the trigger circuit via the corresponding input network. Of course, the electrodes of the two diodes may be interchanged, so that the device is controlled by positive pulses. The control- and reference potentials must then also be changed accordingly. Thus, the control-potential derived from the emitter of the second transistor is applied to the input electrode or cathode of the diode 10 of the first input network and to the output electrode or anode of the diode 20 of the second input network. The output electrode or cathode of the diode 10 is then at earth potential, which serves as a reference potential for this diode, and the input electrode or anode of the diode 20 is then at the reference potential —E*c*.

The output terminal O of the device is connected to the emitter of the second transistor 2. However, as an alternative, a second load resistor could be included in the collector circuit of the second transistor and the input terminal could be connected to this collector. In a first state of the trigger circuit of the device described, the transistor 1 is saturated. The potential of the emitter of the second transistor 2 relative to earth is then comparatively small, so that the diode 10 is cut off by the potential —E*c*. The diode 20 is scarcely cut off by the potential difference between the emitter of the transistor 2 and earth.

If a square-wave pulse is applied to the terminal P, the positive peak of the differentiated signal is suppressed in each input network by the diode 10, respectively 20, and the negative peak of this signal is also suppressed by the diode 10, but passed by the diode 20. Indeed positive peaks increase the cut-off voltage between the electrodes of the diodes; a negative pulse can only be passed by one of the diodes if its amplitude exceeds the value of the cut-off voltage between the electrodes of this diode. The amplitude of the voltage peaks must therefore be smaller than the cut-off voltage at the anode of the diode 10, in order that a control-signal be passed to the emitter of the first transistor, but not to the base thereof. The negative pulse at the emitter of the first transistor cuts off this transistor, so that the second transistor 2 becomes conductive. The saturation current through the second transistor exceeds that of the first transistor, since no load resistor or a load resistor smaller than that of the transistor 1 is included in the collector circuit of the transistor 2, or since said load resistor of the transistor 2 is connected to a point of higher negative potential. The control-potential applied to the cathode of the diode 10 and to the anode of the diode 20 increases accordingly, so that the diode 10 is scarcely cut off, whilst the diode 20 is cut off. The next following pulse is thus passed by the diode 10 and the trigger circuit is switched over into its first state.

Figure 2:
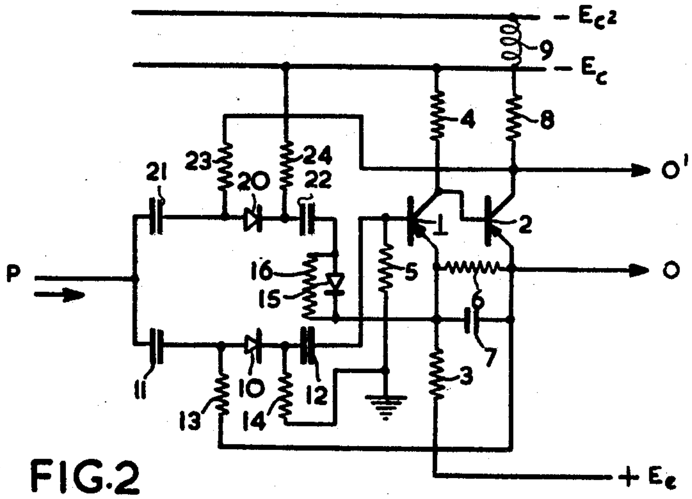
FIG. 2 shows a variant of the embodiment shown in FIG. 1.

The variant shown in FIG. 2 comprises a trigger circuit of the same kind as that of the device shown in FIG. 1. With this trigger circuit however, the collector circuit of the transistor 2 includes a load resistor 8, which is connected to a terminal $-Ec_2$ of higher negative potential. This collector circuit may furthermore include an inductor 9 in series with the resistor 8, this inductor increasing the operation speed of the trigger circuit. The absolute value of the negative potential at the terminal $-Ec_2$ may for example be twice that of the potential at the terminal —E*c*. In order to speed up the operation of the feed-back loop, the resistor 6 between the emitters of the two transistors 1 and 2 is shunted by a capacitor 7.

The input networks of the device shown in FIG. 2 resemble to a high extent those of the device shown in FIG. 1; however, the diodes 10 and 20 are connected in the reverse directions. The control-potential for the diode 10 is derived from the emitter of the transistor 2 and applied via the resistor 13 to the anode or input electrode of this diode, whilst the cathode of the diode 10 is connected to earth via the resistor 14. The control-potential for the diode 20 is, however, obtained from the collector of the transistor 2 and applied via the resistor 23 to the input electrode or anode of this diode. The cathode of the diode 20 is connected to the terminal —E*c* via the resistor 24.

A third diode 15 shunted by a resistor 16 is connected in series between the electrode of the capacitor 22 remote from the diode 20 and the emitter of the transistor 1. This shunted diode enhances the operation speed of the device, since it passes the positive pulses to the emitter of the transistor 1, whilst the voltage variations at the emitter of this transistor are strongly damped and passed to the input network only by the resistor 16. This second embodiment operates, in principle, as the first embodiment shown in FIG. 1, the difference being that the negative voltage peaks are suppressed by the diodes 10 and 20 and that the positive voltage peaks are passed alternately by the diode 10 and the diode 20. If the transistor 1 is saturated, it will be cut off by a positive pulse, which reaches its base via the diode 10. If this same transistor is cut off, it will be rendered conductive by a positive pulse, which reaches its emitter via the diodes 20 and 15. It is obvious that the diode 20 is cut off when the transistor 2 is not conductive and that this diode is conductive when the same transistor is saturated.

The direct-current potential across the capacitor 12 is very small, so that this capacitor may, if desired, be dispensed with. This also applies to further variants of the device according to the invention controlled by negative pulses, for example, to the variant mentioned hereabove of the embodiment shown in FIG. 1.

Figures 3, 4:
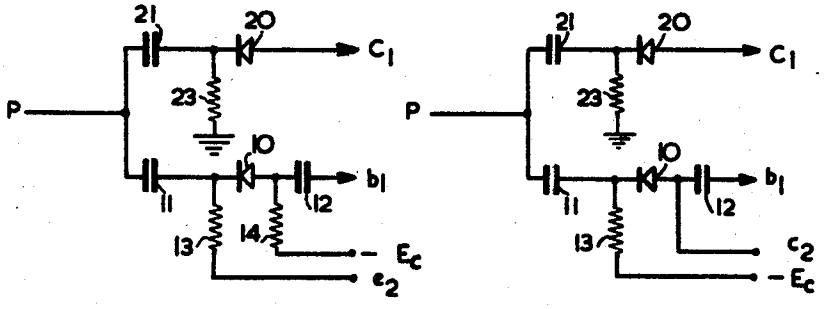
FIG. 3 shows a second variant.
FIG. 4 shows a third variant of this embodiment.

FIG. 3 shows a further variant of the input networks of the device shown in FIG. 2. With this variant the capacitor 22 and the resistor 24 of the second input network are omitted. The second input network is connected to the collector $c_1$ of the first transistor, which constitutes the second input point of the trigger circuit and which supplies, moreover, the control-voltage for the diode 20. The load resistor 4 in the collector circuit of the transistor 1 thus constitutes the second shunt resistor of the second input network. The cathode or input electrode of the diode 20 is connected to earth via the resistor 23. The control-potential for the cathode or input electrode of the diode 10 is again derived from the emitter $e_2$ via the resistor 13 and the anode of this diode is connected to the terminal $-Ec$ via the resistor 14.

The collector of the first transistor constitutes a point of the feed-back loop of the trigger circuit. The input impedance at this point being high, it is not desirable to load the loop at this point. Since the diode 20 of the second input network is connected directly to this collector, the feed-back loop is separated from the second network by this diode, except when a control-pulse is applied to the collector $c_1$ via said diode. Since the collector $c_1$ exhibits comparative high voltage variations and serves at the same time as an input-point, it is not necessary to derive the control-potential therefrom via an impedance which, together with the omitted capacitor 22, would constitute an RC-network having a comparatively high time constant and which would reduce the operational speed of the device. In order to further increase the operational speed, the load resistor 4 for the first transistor 1 could be given a comparatively low value, and a load inductor could be connected in series therewith.

The variant shown in FIG. 4 resembles that of FIG. 3, the difference being that the trigger circuit cooperating therewith must include a load resistor 8 in the collector circuit of the second transistor 2. According to this variant the control-voltage for the diode of the first input network is derived from the collector $c_2$ of the second transistor and applied directly to the anode of the diode 10, whilst the reference potential for the same diode is obtained from the negative potential at the terminal $-Ec$. The resistor 14 is therefore omitted and the load resistor 8 constitutes one of the shunt elements of the first input network, whilst the cathode of the diode 10 is connected to the terminal $-Ec$ via the resistor 13. With this variant, the emitters of the two transistors are therefore neither used as input point, nor as control-potential source and the collectors of the two transistors are both directly connected to an electrode of one of the diodes 10 and 20, so that the collector circuits are separated from the input networks, except during negative control-voltage peaks alternately applied to these collectors via these diodes. The capacitor 12 passes the control-pulses to the base of the first transistor and aids moreover the feed-back action provided by the common emitter resistance.

In further variants derived from those shown in FIGS. 3 and 4 of the embodiment shown in FIG. 1, the diodes 10 and 20 are connected in the reverse direction, so that the trigger circuit is controlled by means of positive voltage peaks. In this case, the reference potentials for these two diodes must be interchanged, so that the capacitor 12 and the resistor 14 may be omitted, since the potential difference across the capacitor 12 is only very small.

Figure 5:
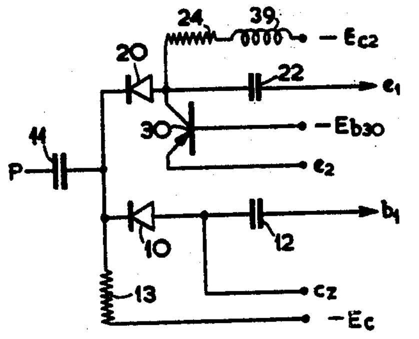
FIG. 5 shows the input networks of a second embodiment.

FIG. 5 shows the input networks of a second embodiment of the device according to the invention. In this embodiment the trigger circuit is identical with that shown in FIG. 2 and the first input network is identical with that of the variant shown in FIG. 4. The second input network is connected to the emitter $e_1$ of the transistor 1. Its diode 20 is biased by the same reference potential $-Ec$ as the diode 10, the resistor 13 as well as the capacitor 11 being connected to the cathodes of the two diodes. The two input networks thus have an input series-capacitor 11 and a shunt resistor 13 in common. The control-potential for the diode 20 is produced by means of a third transistor 30, which is controlled by the trigger circuit. The emitter of this transistor is directly connected to the emitter $e_2$ of the second transistor, its base is connected to a negative terminal $-E_{b30}$, and its collector circuit includes the shunt resistor 24 of the second input network and, in series therewith, an inductor 39, through which this circuit is connected to the terminal $-Ec_2$. The second transistor 2 and the third transistor

30 thus constitute together a bistable trigger circuit and the phase of the control-voltage at the collector of the third transistor is opposite to that of the potential at the collector of the transistor 2. The operational speed of the device is increased owing to the provision of the inductors 9 and 39. Since the control-potential for neither of the diodes 10 and 20 is derived from a point of low impedance as the emitter of the first or of the second transistor, it is not necessary to connect an RC-network to such a point and the device can operate at a higher speed.

Figure 6:
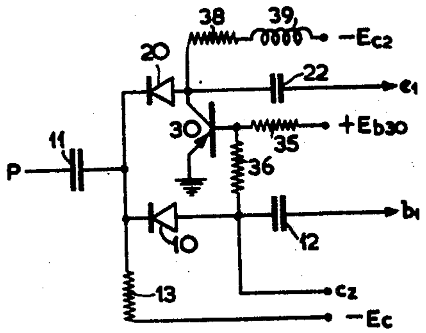
FIG. 6 shows a variant of the embodiment shown in FIG. 5.

FIG. 6 shows a variant of the embodiment shown in FIG. 5. With this variant the emitter of the third transistor 30 is connected to earth, whilst its base is connected to the collector $c_2$ of the second transistor through a resistor 36 and to a positive terminal $+E_{b30}$ through a resistor 35. The resistors 35 and 36 constitute a voltage-divider through which the transistor 30 is controlled by the second transistor 2, in such a manner that the control-voltages for the diodes 10 and 20 derived from the collectors of the transistors 2 and 30 respectively always are of opposite phases. The values of these resistors and of the potential at the terminal $+E_{b30}$ are chosen to be such that the amplitudes of the potential variations at the collectors of the two transistors 2 and 30 as well as the control-potentials alternately applied to the two diodes are practically equal to one another.

Figure 7:
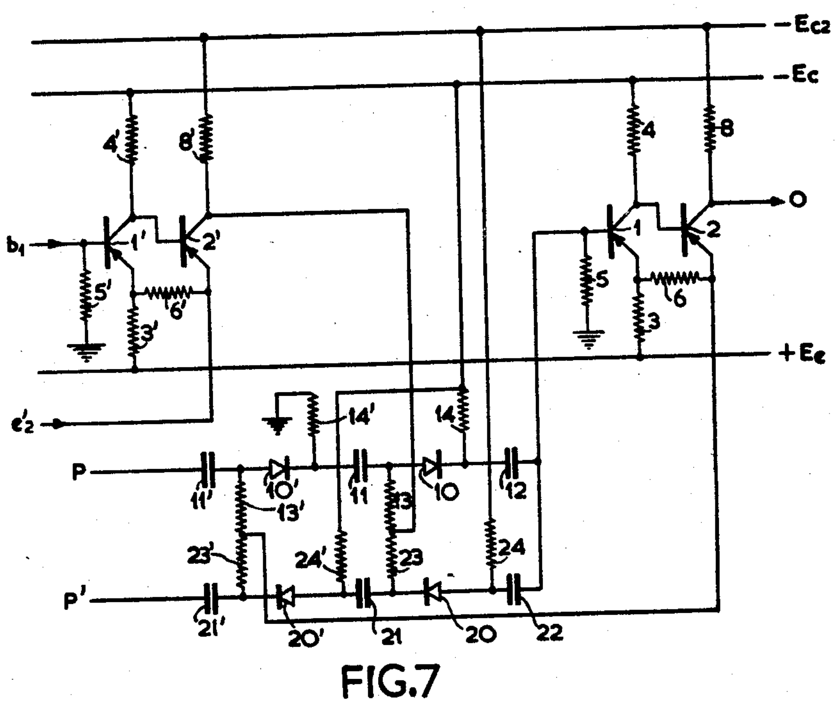
FIG. 7 shows a third embodiment of the invention.

The third embodiment shown in FIG. 7 comprises a trigger circuit with two transistors 1 and 2, which are coupled with one another via their emitter circuits, a feedback loop being completed by a connection between the collector of the transistor 1 and the base of the transistor 2. The collector circuit of each transistor includes a load resistor 4, respectively 8. The emitters of the two transistors are connected to one another via a resistor 6 and the emitter of the first transistor 1 is connected to the terminal $+Ee$ of the voltage source through a common resistor 3. The base of the first transistor is connected to earth via a resistor 5.

The device comprises furthermore two input networks, via which two input terminals P and P′ of the device are connected to a common input point constituted by the base of the transistor 1 of the trigger circuit. Each input network comprises, as series elements, three capacitors 11′, 11 and 12, respectively 21′, 21 and 22, and two rectifier diodes 10′ and 10 respectively 20′ and 20 connected in series between these capacitors and, as shunt elements, four resistors 13′, 14′, 13 and 14 respectively 23′, 24′, 23 and 24 connected to the electrodes of the diodes. The control and reference potentials for each of the four diodes are thus independent of those for the further diodes and of the potentials of the input terminals and of the input point. A pulse source supplying positive pulses is connected to the first input terminal P and a source of negative pulses is connected to the second input terminal P′. The anode of the input diode 10′ of the first input network is connected to the emitter of the second transistor 2, via the first shunt resistor 13′ whilst the cathode of this diode is connected to earth through the second shunt resistor 14′. The anode of the output diode 10 of the first input network is connected to a source of further control-pulses via the third shunt resistor 13 and its cathode is connected to the terminal $-Ec$ through the fourth parallel resistor 14. The diodes of the second input network are connected in a reverse direction with respect to those of the first input network. The cathode of the input diode 20′ of the second input network receives, via the resistor 23′, the same control-potential as the anode of the diode 10′, and the anode of the diode 20′ receives, via the resistor 24, the same reference potential as the cathode of the diode 10. The cathode of the output diode 20 of the second input network is controlled, via the resistor 23 by the same source of control-potential as the anode of the diode 10, and the anode of the diode 20 is connected, via the resistor 24, to the $-Ec_2$ terminal, to which the collector of the second transistor is connected via the resistor 8. The source of further control-signals is constituted by a preceding trigger circuit, which is identical with the trigger circuit first described. These two trigger circuits may, for example, constitute successive stages of a binary shift register. The second trigger circuit includes two transistors 1′ and 2′ and five resistors 3′, 4′, 5′, 6′ and 8′. If desired, the bases of these transistors are connected, via two input networks, to the sources of positive and negative pulses connected to the terminals P and P′. In this case the control-potentials for two diodes of the said input networks may be obtained from the emitter $e'_2$ of the second transistor 2′ of the second trigger circuit.

An electrically represented quantity having two alternate values is registered in the device just described. The instantaneous value of this quantity is determined by the state of the preceding stage comprising the bistable trigger circuit with the transistors 1′ and 2′. This value is represented by a control-signal having rectangular steps, obtained from the output terminal of the second trigger circuit and applied to the two diodes 10 and 20 of the two input networks; this means that via the connection between the collector of the transistor 2′ and the common point of the resistors 13 and 23, the state of the second trigger circuit determines the input network, the output diode 10 respectively 20 of which is cut off.

The pulse sources connected to the point P and P′ are sources supplying simultaneous pairs of so-called clock pulses of opposite polarities. These sources are controlled by a common source of clock pulses. Pulses of a given polarity or pulses of the opposite polarity are passed to the base of the transistor 1 through a corresponding input network in accordance with the control-potential derived from the collector of the transistor 2′ and applied to the diodes 10 and 20, this potential representing the instantaneous state of the second trigger circuit. In accordance with the control-potential applied thereto, the second diode 10 or 20 of each input network will pass clock pulses of one or of the other type and pulses are passed only by the two series-connected diodes 10′ and 10 or 20′ and 20, if the two trigger circuits occupy two different states. Thus, the first trigger circuit with the transistors 1 and 2 is always switched by one pair of clock pulses applied to the terminals P and P′ at an instant when the two trigger circuits occupy different states, so that the trigger circuit with the transistors 1 and 2 always changes its state into the state of the second trigger circuit with the transistors 1′ and 2′. Therefore, the device as a whole operates as an anti-coincidence gating circuit.

It should be noted that the diodes 10′ and 10 or 20′ and 20 of each input network are controlled by two different sources of control-potential and are on the other hand connected to two different sources of reference potential. This is possible, since, as regards direct voltage, each diode is separated from the further parts of the device by means of capacitors.

What is claimed is:

1. A device comprising an asymmetrical trigger circuit having two transistors of the same conductivity type conductively coupled to one another by means of a common impedance connected in their respective emitter circuits and including a feed-back loop constituted by a direct connection between the base of the second transistor and the collector of the first transistor, said trigger circuit having first and second control points at which applied pulses of predetermined polarity switch the circuit from one conductive condition to another, the device further comprising two input networks connected respectively to said first and second control points, each of said input networks comprising, as series elements, at least one rectifier diode and at least one separation capacitor connected in series with the diode, a source of reference potential connected to a first electrode of each diode, and means connected to apply to the second electrode of each diode a control-potential varying with the state of the trigger circuit, said input networks being connected between a single input terminal and the two different control points of the trigger circuit respectively, a source of pulses of the same polarity being connected to said input terminal, the first input network being directly connected to the base of the first transistor constituting the first control point of the trigger circuit, and the second input network being directly connected to another electrode of the first transistor constituting the second control point of the trigger circuit.

2. A device as claimed in claim 1, characterized in that the diode of at least one of the input networks is connected in series between two capacitors, so that the control- and reference potentials for this diode are independent from the potentials at the input terminal and at the corresponding input point of the trigger circuit.

3. A device as claimed in claim 2, characterized in that the diode of each of the two input networks is connected in series between two capacitors, and in that the second input network is connected to the emitter of the first transistor, the control-potential for the diode of at least the first input network being derived via a shunt resistor from the emitter of the second transistor.

4. A device as claimed in claim 3, characterized in that one electrode of the diode of the first input network and the opposite electrode of the diode of the second input network are connected to the emitter of the second transistor via corresponding parallel resistors, which emitter provides the control-potentials for these two diodes, the reference potentials being derived, via corresponding shunt resistors, from the collector terminal of the voltage source and from a point at constant potential connected to the base of the first transistor respectively.

5. A device as claimed in claim 4, characterized in that one electrode of the diode of the first input network and the corresponding electrode of the diode of the second input network are respectively connected to the emitter and to the collector of the second transistor via corresponding shunt resistors, the collector circuit of the second transistor including a load resistor and the reference potentials being derived from two different points of constant potential, via corresponding shunt resistors.

6. A device as claimed in claim 1, characterized in that the control-potential for the diode of the second input network is derived from the collector of the first transistor.

7. A device as claimed in claim 6, characterized in that the output electrode of the diode of the second input network is directly connected to the collector of the first transistor.

8. A device as claimed in claim 6, characterized in that the control potential for the diode of the first input network is obtained from the emitter of the second transistor and the reference potentials are respectively obtained, via corresponding shunt resistors, from the collector terminal of the voltage source and from a point of constant potential connected to the base of the first transistor.

9. A device as claimed in claim 6, characterized in that the control-potential for the diode of the first input network is obtained from the collector of the second transistor and the reference potentials are respectively obtained, via corresponding shunt resistors, from the collector terminal of the voltage source and from a point of constant potential connected to the base of the first transistor, the collector circuit of the second transistor including a load resistor.

10. A device comprising an asymmetrical trigger circuit having two transistors of the same conductivity type conductively coupled to one another by means of a common impedance connected in their respective emitter circuits and including a feed-back loop constituted by a direct connection between the base of the second transistor and the collector of the first transistor, said trigger circuit having first and second control points at which applied pulses of predetermined polarity switch the circuit from one conductive condition to another, the device further comprising two input networks connected respectively to said first and second control points, each of said input networks comprising, as series elements, at least two rectifier diodes and two capacitors, a source of reference potential connected to a first electrode of the second diode of each input network and means connected to apply to the second electrode of each of these diodes a control potential having two alternate values, said control and reference potentials allowing a control-pulse to reach a control point of the trigger circuit via the two diodes of the corresponding input network only when a predetermined relation exists between the state of the trigger circuit and the value of the corresponding control potential.

11. A device as claimed in claim 10, characterized in that at least one of the input networks comprises, as series elements, three capacitors and two diodes connected in series between these capacitors, and, as shunt elements, four resistors connected to the electrodes of the diodes, so that the control- and reference potentials for these diodes are independent from one another and from the potentials at the corresponding input terminal and input point.

12. A device as claimed in claim 11, in which the input networks are connected between a single input point of the trigger circuit and two different input terminals connected to two sources of pulses of opposite polarities respectively, characterized in that one electrode of the output diode of the first input network and the opposite electrode of the output diode of the second input network are connected, via corresponding capacitors, to the same electrode of the first transistor and in that one electrode of the input diode of the first input network and the opposite electrode of the input diode of the second input network are connected, via corresponding capacitors, to one pulse source and to the other pulse source respectively, the second input network comprising also three series capacitors and four parallel resistors.

13. A device as claimed in claim 12, characterized in that the control-potentials for one of the diodes of each input network are obtained from that of one of the electrodes of the emitter-collector circuit of the second transistor.

14. A device comprising an asymmetrical trigger circuit having two transistors of the same conductivity type conductively coupled to one another via their emitter circuits and including a feed-back loop connected by a direct conductive connection between the base of the second transistor and the collector of the first transistor, said trigger circuit having first and second control points at which applied pulses of predetermined polarity switch the circuit from one conductive condition to another, the device further comprising two input networks connected respectively to said first and second control points, each of said input networks comprising, as series elements, at least one rectifier diode and at least one separation capacitor connected in series with the diode, a source of reference potential connected to a first electrode of each diode, and means connected to apply to the second electrode of each diode a control-potential varying with the state of the trigger circuit, said input networks being connected between a single input terminal and the two different control points of the trigger circuit respectively, a source of pulses of the same polarity being connected to said input terminal, the first input network being directly connected to the base of the first transistor constituting the first control point of the trigger circuit, and the second input network being directly connected to another electrode of the first transistor constituting the second control point of the trigger circuit, and a third transistor, the control-potentials for the diodes of the first and of the second input networks being obtained from the collector of the second and from the collector of the third transistor respectively, said third transistor being connected as an impedance transformer controlled by the trigger circuit.

15. A device comprising an asymmetrical trigger circuit having two transistors of the same conductivity type conductively coupled to one another via their emitter circuits and including a feed-back loop connected by a direct conductive connection between the base of the second transistor and the collector of the first transistor, said trigger circuit having first and second control points at which applied pulses of predetermined polarity switch the circuit from one conductive condition to another, the device further comprising two input networks connected respectively to said first and second control points, each of said input networks comprising, as series elements, at least one rectifier diode and at least one separation capacitor connected in series with the diode, a source of reference potential connected to a first electrode of each diode, and means connected to apply to the second electrode of each diode a control-potential varying with the state of the trigger circuit, said input networks being connected between a single input terminal and the two different control points of the trigger circuit respectively, a source of pulses of the same polarity being connected to said input terminal, the first input network being directly connected to the base of the first transistor constituting the first control point of the trigger circuit, and the second input network being directly connected to another electrode of the first transistor constituting the second control point of the trigger circuit, and a third transistor, the control-potentials for the diodes of the first and of the second input networks being obtained from the collector of the second and from the collector of the third transistor respectively, said third transistor being connected as an impedance transformer controlled by the trigger circuit, the reference potentials for the diodes of the two input networks being obtained from a point of constant potential, a common shunt resistor being connected between respective electrodes of said diodes and said point of constant potential, the absolute value of said constant-potential point being lower than that of the potential at the collector terminal of the voltage source for the second and third transistors.

16. A device as claimed in claim 15, characterized in that the emitter of the third transistor is connected to a point of constant potential and that its base is connected to the tapping of a voltage divider connected between the collector of the second transistor and a point of constant potential, the values of the resistors of the voltage-divider and of the potentials of the said points of constant potential being chosen to be such that the control-potentials alternately applied to the two diodes are substantially equal to one another.

17. A device comprising an asymmetrical trigger circuit having two transistors of the same conductivity type conductively coupled to one another via their emitter circuits and including a feed-back loop connected by a direct conductive connection between the base of the second transistor and the collector of the first transistor, said trigger circuit having first and second control points at which applied pulses of predetermined polarity switch the circuit from one conductive condition to another, the device further comprising two input networks connected respectively to said first and second control points, each of said input networks comprising, as series elements, at least one rectifier diode and at least one separation capacitor connected in series with the diode, a source of reference potential connected to a firse electrode of each diode, and means connected to apply to the second electrode of each diode a control-potential varying with the state of the trigger circuit, said input networks being connected between a single input terminal and the two different control points of the trigger circuit respectively, a source of pulses of the same polarity being connected to said input terminal, the first input network being directly connected to the base of the first transistor constituting the first control point of the trigger circuit, and the second input network being directly connected to another electrode of the first transistor constituting the second control point of the trigger circuit, and a third transistor, the control-potentials for the diodes of the first and of the second input networks being obtained from the collector of the second and from the collector of the third transistor respectively, said third transistor being connected as an impedance transformer controlled by the trigger circuit, the reference potentials for the diodes of the two input networks being obtained from a point of constant potential, a common shunt resistor being connected between respective electrodes of said diodes and said point of constant potential, the absolute value of said constant-potential point being lower than that of the potential at the collector terminal of the voltage source for the second and third transistors, the emitter of the third transistor being conductively connected to the emitter of the second transistor, and the base of the third transistor being connected to a point of constant potential, whereby the control-potentials for the first and second input networks vary in opposite directions.

References Cited in the file of this patent

UNITED STATES PATENTS

| | | |
|---|---|---|
| 2,569,345 | Shea | Sept. 25, 1951 |
| 2,628,310 | Wood | Feb. 10, 1953 |
| 2,644,897 | Lo | July 7, 1953 |
| 2,663,806 | Darlington | Dec. 22, 1953 |
| 2,673,936 | Harris | Mar. 30, 1954 |
| 2,724,061 | Emery | Nov. 15, 1955 |
| 2,761,965 | Dickinson | Sept. 4, 1956 |
| 2,843,761 | Carlson | July 15, 1958 |
| 2,854,589 | Ingham | Sept. 30, 1958 |
| 2,861,200 | Henle et al. | Nov. 18, 1958 |